(12) United States Patent
Soejima

(10) Patent No.: US 12,220,839 B2
(45) Date of Patent: Feb. 11, 2025

(54) INSPECTION SUBSTRATE

(71) Applicant: DISCO CORPORATION, Tokyo (JP)

(72) Inventor: Yoshikatsu Soejima, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 641 days.

(21) Appl. No.: 17/398,289

(22) Filed: Aug. 10, 2021

(65) Prior Publication Data

US 2022/0063134 A1 Mar. 3, 2022

(30) Foreign Application Priority Data

Aug. 26, 2020 (JP) .................................. 2020-142767

(51) Int. Cl.
*B28D 5/00* (2006.01)
*G01N 21/95* (2006.01)

(52) U.S. Cl.
CPC ....... *B28D 5/0058* (2013.01); *G01N 21/9501* (2013.01)

(58) Field of Classification Search
CPC .......... G01N 21/9501; G01N 21/95607; H01L 22/12; B28D 5/0058; B24B 24/16; B24B 24/05
See application file for complete search history.

(56) References Cited

U.S. PATENT DOCUMENTS

| | | | | |
|---|---|---|---|---|
| 3,562,383 A * | 2/1971 | Scott | .................... | B29C 67/0011 264/296 |
| 6,160,615 A * | 12/2000 | Matsui | .............. | H01L 21/67288 356/601 |
| 6,827,895 B1 * | 12/2004 | Yamamoto | .............. | B29C 45/14 264/266 |
| 2002/0069512 A1 * | 6/2002 | Adams | ................... | H01F 41/041 336/200 |
| 2006/0032761 A1 * | 2/2006 | Oguri | .................... | G01N 27/121 204/421 |
| 2006/0147745 A1 * | 7/2006 | Choi | ....................... | B05D 5/061 428/626 |
| 2007/0261340 A1 * | 11/2007 | Cecilio | ................... | E04D 13/00 52/311.1 |
| 2016/0238418 A1 * | 8/2016 | Fujita | ...................... | G01D 11/28 |
| 2017/0133269 A1 * | 5/2017 | Obata | ................. | H01L 21/6836 |
| 2017/0186646 A1 * | 6/2017 | Ohkubo | ............... | B28D 5/0058 |
| 2017/0343344 A1 * | 11/2017 | Rattunde | .............. | B23D 59/008 |
| 2018/0207804 A1 * | 7/2018 | Itou | ......................... | B25J 13/088 |

(Continued)

FOREIGN PATENT DOCUMENTS

| | | |
|---|---|---|
| JP | 11034039 A | 2/1999 |
| JP | 2012178511 A | 9/2012 |
| JP | 2019021677 * | 2/2019 ........... H01L 21/301 |

*Primary Examiner* — Evan H MacFarlane
*Assistant Examiner* — Fernando A Ayala
(74) *Attorney, Agent, or Firm* — Greer, Burns & Crain, Ltd.

(57) ABSTRACT

An inspection substrate for use in inspecting whether or not a constituent element of a cutting apparatus forms a scratch on a top surface of a workpiece when a cutting blade cuts the workpiece, the inspection substrate includes a top surface side of the inspection substrate having a groove portion for simulated cutting, the groove portion having a width that the cutting blade can pass through, and a paint layer disposed on the top surface side of the inspection substrate to improve visibility of a scratch formed on the top surface side.

13 Claims, 8 Drawing Sheets

(56) References Cited

U.S. PATENT DOCUMENTS

2019/0016174 A1* 1/2019 Kim .................... B41M 3/12
2019/0375051 A1* 12/2019 Regaard .............. B23K 26/38
2024/0131812 A1* 4/2024 Skeren ................ B29C 45/73

* cited by examiner

INSPECTION SUBSTRATE

BACKGROUND OF THE INVENTION

Field of the Invention

The present invention relates to an inspection substrate for use in inspecting whether or not a constituent element of a cutting apparatus forms a scratch on a top surface of a workpiece when a cutting blade cuts the workpiece, and an inspecting method of inspecting whether or not a scratch is formed on the top surface of the workpiece by using the inspection substrate.

Description of the Related Art

Various kinds of electronic equipment include a device chip having a device such as an integrated circuit (IC) or a large scale integration (LSI). The device chip is manufactured by dividing a wafer (workpiece) having a plurality of devices formed on the top surface side of a semiconductor wafer into individual devices by using a cutting apparatus or the like. The cutting apparatus has a spindle fitted at a distal end portion thereof with a cutting blade. A part of the spindle is rotatably housed in a spindle housing. A blade cover that partially covers the cutting blade is coupled to the spindle housing.

The blade cover is provided with a cutting water supply nozzle for supplying cutting water to a processing point at which the cutting blade and the workpiece are in contact with each other at a time of cutting the workpiece (see Japanese Patent Laid-open No. Hei 11-34039, for example). A chuck table for holding the workpiece under suction is disposed below the spindle housing. A ball screw type processing feed unit is coupled to a lower part of the chuck table. The processing feed unit moves the chuck table between (i) a mounting and demounting region in which the workpiece is mounted and demounted and (ii) a cutting region in which the workpiece is cut.

A vertically movable partition plate is provided between the mounting and demounting region and the cutting region in order to reduce the flowing out of cutting waste and mist produced during cutting from the cutting region to the mounting and demounting region (see Japanese Patent Laid-open No. 2012-178511, for example). A lower end of the partition plate is set at such a height as not to be in contact with the workpiece when the workpiece held by the chuck table moves between the mounting and demounting region and the cutting region. However, in work of replacing the partition plate, the partition plate may be erroneously attached at a position lower than a specified position. In addition, in work of replacing the cutting blade or work of adjusting the position of the cutting water supply nozzle, a distal end portion of the cutting water supply nozzle may be erroneously attached at a position lower than a specified position.

In such a case, there is a problem in that the partition plate or the cutting water supply nozzle comes into contact with the upper surface of the workpiece and makes a scratch (contact trace), and a defective product is consequently produced. If the problem with the partition plate, the cutting water supply nozzle, or the like cannot be found at an early stage, defective products are produced successively. Accordingly, the external appearance of the workpiece after the cutting may be inspected in order to inspect whether or not constituent elements of the cutting apparatus such as the partition plate and the cutting water supply nozzle are attached normally. For example, an automatic optical inspection (AOI) apparatus may be used to inspect the top surface of the workpiece.

SUMMARY OF THE INVENTION

However, the automatic optical inspection apparatus is very expensive, and therefore cost incurred for the inspection becomes high. In addition, the automatic optical inspection apparatus sequentially inspects very narrow areas, and therefore the inspection of the whole of the top surface of the workpiece takes time. On the other hand, when the inspection areas and inspection positions are limited, there is a possibility of overlooking a scratch made on the workpiece, so that the occurrence of defective products cannot be found at an early stage. The present invention has been made in view of such problems. It is an object of the present invention to inspect, at relatively low cost, whether or not constituent elements of the cutting apparatus are attached normally instead of inspecting a workpiece by an automatic optical inspection apparatus.

In accordance with an aspect of the present invention, there is provided an inspection substrate for use in inspecting whether or not a constituent element of a cutting apparatus forms a scratch on a top surface of a workpiece when a cutting blade cuts the workpiece, the inspection substrate including a top surface side of the inspection substrate having a groove portion for simulated cutting, the groove portion having a width that the cutting blade can pass through, and a paint layer disposed on the top surface side of the inspection substrate to improve visibility of a scratch formed on the top surface side.

Preferably, a pigment of the paint layer includes carbon, silicon oxide, or titanium oxide.

In accordance with another aspect of the present invention, there is provided an inspecting method of inspecting, by using an inspection substrate, whether or not a constituent element of a cutting apparatus forms a scratch on a top surface of a workpiece when a cutting blade cuts the workpiece, the inspection substrate including a top surface side of the inspection substrate having a groove portion for simulated cutting, the groove portion having a width that the cutting blade can pass through, and a paint layer disposed on the top surface side of the inspection substrate to improve visibility of a scratch formed on the top surface side, the inspecting method including a holding step of holding an undersurface side of the inspection substrate, with the top surface of the inspection substrate set upward, by a chuck table disposed in a mounting and demounting region in which the inspection substrate is mounted or demounted, a moving step of moving the chuck table from the mounting and demounting region to a cutting region in which simulated cutting of the inspection substrate is performed after the holding step, a simulated cutting step of performing the simulated cutting by positioning a lower end of the cutting blade at a predetermined height higher than a bottom of the groove portion and passing a part of the cutting blade in the groove portion, and an image obtaining step of obtaining an image of the top surface side of the inspection substrate.

The inspection substrate according to one mode of the present invention has, on the top surface side of the inspection substrate, the paint layer for improving visibility of a scratch formed on the top surface side of the inspection substrate. In a case where the chuck table holding under suction the undersurface side of the inspection substrate is moved from the mounting and demounting region to the cutting region, when the lower end of the partition plate is in contact with the top surface side of the inspection substrate, for example, the paint layer in a contacted region is peeled off. In addition, the inspection substrate according to one mode of the present invention has the groove portion for simulated cutting on the top surface side of the inspection substrate, the groove portion having a width that the cutting blade can pass through. In a case where the cutting blade and the chuck table holding under suction the undersurface side of the inspection substrate are moved relative to each other such that a part of the cutting blade passes the groove portion, when the distal end portion of the cutting water supply nozzle is in contact with the top surface side of the inspection substrate, for example, the paint layer in a contacted region is peeled off.

The presence or absence of peeling of the paint layer can be detected by using an imaging unit generally included in the cutting apparatus. It is therefore possible to inspect whether or not constituent elements such as the partition plate and the cutting water supply nozzle are attached normally at relatively low cost as compared with a case where the workpiece is inspected by an automatic optical inspection apparatus. In addition, if the peeling of the paint layer does not occur, the same inspection substrate can be used again. Thus, inspection cost can be reduced by reusing the inspection substrate.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 5 is a view illustrating a partition plate and the like.

DETAILED DESCRIPTION OF THE PREFERRED EMBODIMENT

Figure 1:
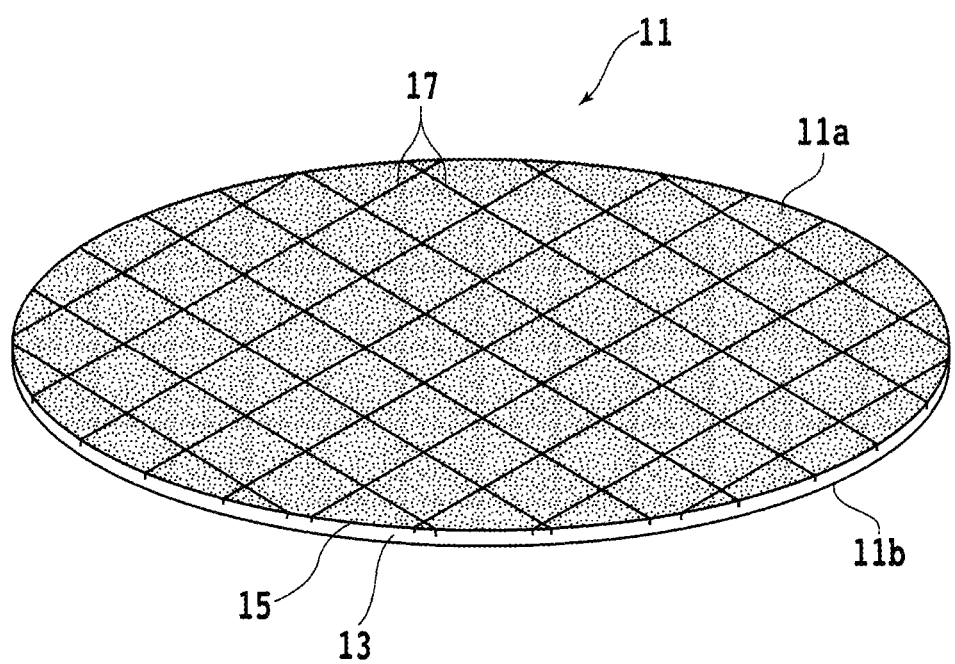
FIG. 1 is a perspective view of an inspection substrate.
Figure 2:
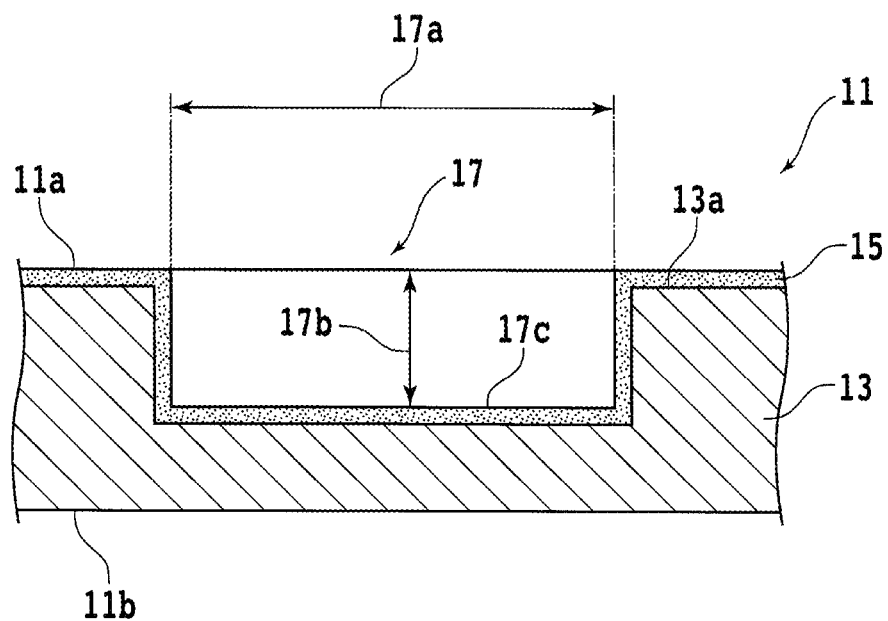
FIG. 2 is an enlarged sectional view of a part of the inspection substrate.

An embodiment according to one mode of the present invention will be described with reference to the accompanying drawings. An inspection substrate 11 will be described first. FIG. 1 is a perspective view of the inspection substrate 11 according to a preferred embodiment. FIG. 2 is an enlarged sectional view of a part of the inspection substrate 11. The inspection substrate 11 is used to inspect whether or not constituent elements of a cutting apparatus 2 form a scratch (contact trace) on a top surface 21a of a workpiece 21 when a cutting blade 32 cuts the workpiece 21 (see FIG. 3).

The inspection substrate 11 has substantially the same diameter as the workpiece 21. However, because it is assumed that the inspection substrate 11 is not cut by the cutting blade 32, the thickness of the inspection substrate 11 is different from a thickness corresponding to the diameter of a wafer made of silicon as defined in a standard of Semiconductor Equipment and Materials International (SEMI) or the like. The inspection substrate 11 according to the present embodiment, for example, includes a disk-shaped wafer 13 made of a resin and having a diameter of approximately 300 mm and a thickness of approximately 2 mm. Used as the resin is polycarbonate, polyethylene terephthalate, or the like.

When the wafer 13 is formed by a resin, the wafer 13 can be manufactured inexpensively as compared with a case where the wafer 13 is formed by silicon. It is to be noted that the material of the wafer 13 is not necessarily limited to resin. The wafer 13 may be formed by a semiconductor such as silicon or another material. A paint layer 15 is provided on the whole of a top surface 13a side of the wafer 13 (top surface 11a side of the inspection substrate 11). In the present embodiment, the topmost surface of the paint layer 15 is set as the top surface 11a of the inspection substrate 11. In addition, an undersurface 11b of the inspection substrate 11 corresponds to the undersurface of the wafer 13.

The thickness of the paint layer 15 is, for example, 10 µm to several tens of µm, and is sufficiently smaller than a width 17a or a depth 17b of a groove portion 17 to be described later. The paint layer 15 is provided on the whole of the top surface 11a side including side portions and a bottom portion of the groove portion 17. The paint layer 15, for example, includes a pigment having carbon such as a carbon black or a carbon nanotube. The paint layer 15 exhibiting a substantially uniform black color is formed by coating the top surface 13a side of the wafer 13 on which side a plurality of groove portions 17 are formed with a paint in which the carbon black is dispersed in an organic solvent, and thereafter drying the paint.

The paint layer 15 is used to improve visibility of a scratch formed on the top surface 11a of the inspection substrate 11. For example, when a scratch is formed on the top surface 11a side, the paint layer 15 in a region corresponding to the scratch is peeled off, and the top surface 13a of the wafer 13 is exposed. The color of the wafer 13 is different from the color of the paint layer 15. Thus, when an imaging unit 24a (see FIG. 3) usually included in the cutting apparatus 2 captures an image of the top surface 11a side, for example, the peeling of the paint layer 15 can be detected without the use of a high-performance automatic optical inspection apparatus.

The pigment constituting the paint layer 15 is not limited to carbon, but may include silica (silicon oxide). A pigment including silica is, for example, formed by silica powder or sludge formed by swarf produced accompanying the cutting, grinding, or the like of a wafer made of silicon. The sludge includes a silicon oxide doped with boron (B), phosphorus (P), or the like, a silicon metal oxide, or the like in addition to silica. In a case where a pigment including the sludge is used, the paint layer 15 exhibits a substantially uniform gray color.

Incidentally, the pigment constituting the paint layer 15 may include titania (titanium oxide), or may include calcium carbonate. In a case where a pigment including titanium oxide or calcium carbonate is used, the paint layer 15 exhibits a substantially uniform white color. Incidentally, an underlayer (not illustrated) for controlling adhesion of the paint layer 15 to the wafer 13 may be provided between the wafer 13 and the paint layer 15. For example, when a silicone resin, a fluorocarbon resin, or the like is formed as the underlayer, the adhesion of the paint layer 15 is reduced, and thus the paint layer 15 is peeled off easily (that is, visibility of a scratch is improved).

A predetermined pattern (not illustrated) used to identify the positions of the groove portions 17, the orientation of the wafer 13, or the like is formed on the top surface 13a side of the wafer 13. The predetermined pattern is referred to as a key pattern, an alignment mark, or the like. The predetermined pattern is recessed from the top surface 13a by a predetermined depth, or is protruded from the top surface 13a by a predetermined height. Thus, even when the paint layer 15 is formed on the top surface 13a, the imaging unit 24a usually included in the cutting apparatus 2 can identify the predetermined pattern.

A plurality of groove portions 17 are arranged in a lattice manner on the top surface 13a side of the wafer 13. In simulated cutting to be described later, the cutting blade 32 passes each of the groove portions 17. An interval between two groove portions 17 adjacent to each other is, for example, a predetermined value equal to or more than 10 mm and equal to or less than 20 mm. When the interval between the groove portions 17 is thus set relatively large, a time taken for the simulated cutting can be shortened, and efficient simulated cutting is made possible. The groove portions 17 have a width 17a of a sufficient dimension for the cutting blade 32 normally having a blade thickness of approximately 100 μm to be able to pass the groove portions 17 (see FIG. 2). The width 17a is a length in a direction orthogonal to the longitudinal direction of the groove portion 17 on the top surface 11a. The width 17a is, for example, 5 mm.

When the width 17a of the groove portion 17 is thus set relatively large, contact of the cutting blade 32 with the inner side surfaces of the groove portion 17 in the simulated cutting can be suppressed relatively easily as compared with a case where the width 17a is equal to the thickness of the cutting blade 32. The depth 17b of the groove portion 17 is a length from the top surface 11a to a bottom 17c of the groove portion 17, and is equal to or larger than a maximum amount of blade protrusion of the cutting blade 32. The depth 17b is, for example, 1.5 mm. When the depth 17b is set relatively large, cutting of the bottom 17c of the groove portion 17 by the simulated cutting can be suppressed relatively easily as compared with a case where the depth 17b is smaller than the amount of blade protrusion of the cutting blade 32.

Figure 3:
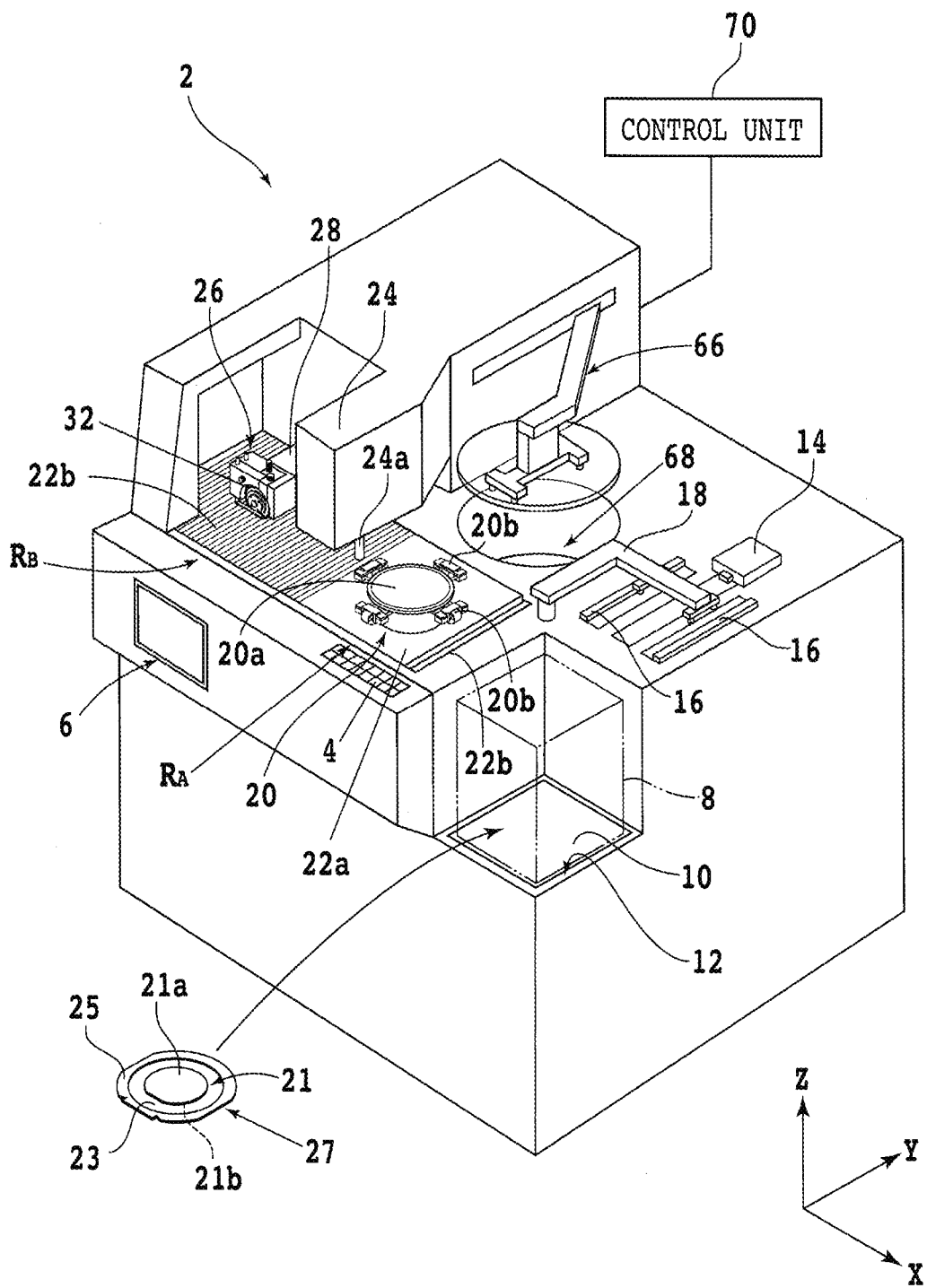
FIG. 3 is a perspective view of a cutting apparatus.

The cutting apparatus 2 in which the inspection substrate 11 is used will next be described. FIG. 3 is a perspective view of the cutting apparatus 2. Incidentally, FIG. 3 illustrates a part of constituent elements of the cutting apparatus 2 as a functional block. In addition, in the following, an X-axis direction (a processing feed direction), a Y-axis direction (an indexing feed direction), and a Z-axis direction (a height direction, an upward-downward direction, or a cutting feed direction) are directions orthogonal to each other. The front surface of the cutting apparatus 2 is provided with an operating panel 4. An operator can, for example, set processing conditions or the like to the cutting apparatus 2 by performing predetermined input via the operating panel 4. A side surface on the front side of the cutting apparatus 2 is provided with a monitor (display device) 6.

The monitor 6 displays a guidance screen for guiding the operator in operation, an image captured by the imaging unit 24a (to be described later), or the like. Incidentally, the monitor 6 may be a touch panel functioning also as the operating panel 4. In this case, the operating panel 4 is omitted. The cutting apparatus 2 generally cuts the workpiece 21. A plurality of planned dividing lines (streets) (not illustrated) are set in a lattice manner on the top surface 21a side of the workpiece 21. A device (not illustrated) such as an integrated circuit (IC) or a large scale integration (LSI) is formed in each of regions demarcated by the plurality of planned dividing lines.

A circular dicing tape 23 formed of a resin is affixed to an undersurface 21b side of the workpiece 21. The diameter of the dicing tape 23 is larger than the diameter of the workpiece 21. The workpiece 21 is affixed to a central portion of the dicing tape 23, and one surface of an annular frame 25 formed of a metal is affixed to an outer circumferential portion of the dicing tape 23. The workpiece 21 is housed in a cassette 8 in a form of a frame unit 27 in which the workpiece 21 is supported by the frame 25 via the dicing tape 23. When the inspection substrate 11 is to be introduced into the cutting apparatus 2, the inspection substrate 11 is housed in the cassette 8 in a form of a frame unit (not illustrated) in which the inspection substrate 11 is supported by the frame 25 via the dicing tape 23.

The cassette 8 is disposed on a cassette table 10. A cassette elevator 12 that moves the cassette table 10 upward and downward is coupled to a lower part of the cassette table 10. A push-pull arm 14 is provided in the rear of the cassette table 10. The push-pull arm 14 unloads the workpiece 21 or the inspection substrate 11 in the form of a frame unit from the cassette 8 and loads the workpiece 21 or the inspection substrate 11 in the form of a frame unit into the cassette 8. A pair of positioning members (guide rails) 16 that adjust the position of the frame unit in the X-axis direction is provided on both sides of a path of movement of the push-pull arm 14.

A first transporting unit 18 that transports the frame unit from the pair of positioning members 16 is provided in the vicinity of the pair of positioning members 16. The first transporting unit 18 includes an arm, a swing mechanism provided to one end side of the arm, and a suction mechanism provided to another end side of the arm. The suction mechanism, for example, has a vacuum pad that sucks the frame 25. The first transporting unit 18 transports the frame unit by rotating the arm by a predetermined angle by the swing mechanism in a state of sucking the frame 25 by the suction mechanism.

The first transporting unit 18 transports the frame unit to a chuck table 20 disposed in a mounting and demounting region $R_A$ located in the vicinity of the cassette table 10 in the X-axis direction. A disk-shaped porous plate is fixed to the upper surface side of the chuck table 20. One end of a flow passage (not illustrated) formed within the chuck table 20 is connected to the lower surface side of the porous plate. A suction source (not illustrated) such as an ejector is connected to another end of the flow passage. A negative pressure can be transmitted to the upper surface of the porous plate by operating the suction source. Hence, the upper surface of the chuck table 20 functions as a holding surface 20a that holds the frame unit under suction.

Incidentally, a plurality of clamp units 20b for fixing the frame 25 are provided to an outer circumferential portion of the chuck table 20. A θ table (not illustrated) that rotates the chuck table 20 about a predetermined rotational axis is coupled to a lower part of the chuck table 20. A ball screw type processing feed unit (not illustrated) is coupled to a further lower part of the θ table.

The processing feed unit moves the chuck table 20 along the X-axis direction together with the θ table. Specifically, the chuck table 20 moves between the mounting and demounting region $R_A$ in which the workpiece 21 or the inspection substrate 11 is mounted or demounted onto or from the holding surface 20a and a cutting region $R_B$ in which the workpiece 21 is actually cut or the inspection substrate 11 is cut in a simulated manner. A rectangular cover member 22a is provided between the θ table and the chuck table 20. Bellows 22b capable of expanding and contracting in the X-axis direction are arranged on both sides in the X-axis direction of the cover member 22a. A supporting member 24 is disposed above the chuck table 20.

The imaging unit 24a is provided to the supporting member 24 in such a manner as to be able to face the holding surface 20a. The imaging unit 24a is, for example, an optical microscope camera including a predetermined optical system and an imaging element such as a charge-coupled device (CCD) image sensor or a complementary metal oxide semiconductor (CMOS) image sensor. The imaging unit 24a obtains an image by capturing the top surface 21a side of the workpiece 21 or the top surface 11a side of the inspection substrate 11. The image obtained by the imaging unit 24a is stored in a storage device included in the cutting apparatus 2 and is further displayed on the monitor 6.

The imaging unit 24a is a constituent element of the cutting apparatus 2, which constituent element is generally included in the cutting apparatus 2 for alignment. A cutting unit 26 is provided on one side in the X-axis direction of the imaging unit 24a. A ball screw type cutting feed unit (not illustrated) for moving the cutting unit 26 along the Z-axis direction is coupled to the cutting unit 26. In addition, a ball screw type indexing feed unit for moving the cutting feed unit along the Y-axis direction is coupled to the cutting feed unit.

Figure 4:
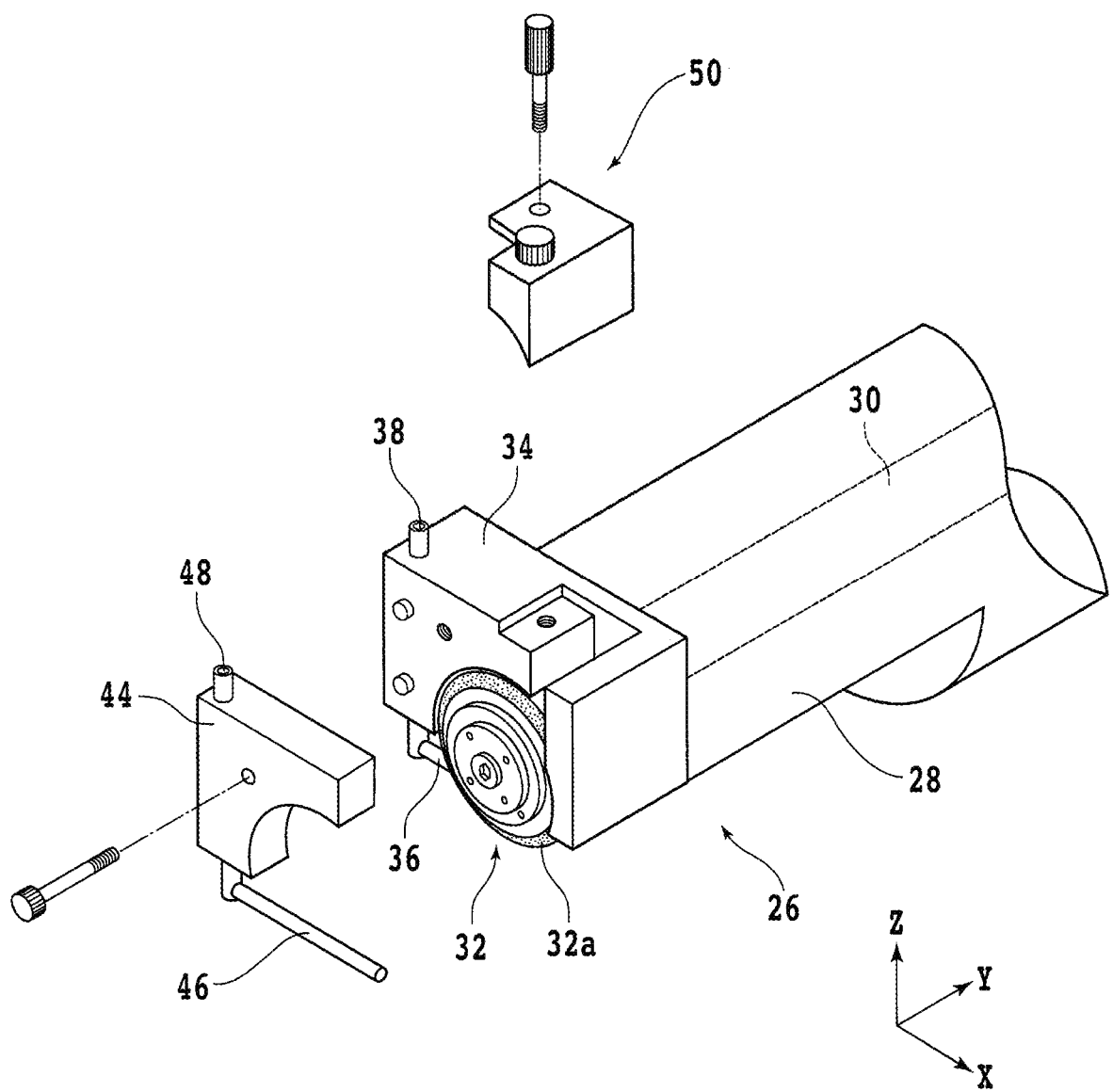
FIG. 4 is an exploded perspective view of a cutting unit.

The cutting unit 26 will be described in the following with reference to FIG. 4. FIG. 4 is an exploded perspective view of the cutting unit 26. The cutting unit 26 has a cylindrical spindle housing 28. A part of a cylindrical spindle 30 is housed in a rotatable manner in the spindle housing 28. A rotational driving source (not illustrated) such as a motor is provided to one end portion of the spindle 30. The cutting blade 32 is fitted to another end portion of the spindle 30.

The cutting blade 32 is, for example, a hub type blade having a disk-shaped hub base made of aluminum. An annular cutting edge 32a in which abrasive grains formed of diamond or the like are fixed in a state of being dispersed in an electroformed bond is fixed to the side surface of the hub base. A blade cover 34 is fixed to the spindle housing 28 so as to cover an upper part of the cutting blade 32. A cutting water supply nozzle 36 is attached to the blade cover 34 so as to be adjacent to one side surface of the cutting blade 32.

Cutting water is, for example, pure water. The cutting water is supplied to the cutting water supply nozzle 36 through a pipe 38 provided to an upper portion of the blade cover 34. A detachable cover 44 is fitted to a side portion of the blade cover 34. The detachable cover 44 has a cutting water supply nozzle 46. The cutting water supply nozzle 46 is disposed so as to be adjacent to another side surface of the cutting blade 32 when the detachable cover 44 is fitted to the side portion of the blade cover 34.

The cutting water is supplied to the cutting water supply nozzle 46 through a pipe 48 provided to an upper portion of the detachable cover 44. An optical blade damage detecting unit 50 is fitted to an upper portion of the blade cover 34. At a time of work of replacing the cutting blade 32, the detachable cover 44 is first removed from the blade cover 34, and the cutting blade 32 is next removed from the spindle 30. Then, after a new cutting blade 32 is fitted to the spindle 30, the detachable cover 44 is attached to the blade cover 34.

In addition, at a time of work of adjusting the positions of the cutting water supply nozzles 36 and 46, the positions are adjusted by adjusting attachment positions of the blade cover 34 and the detachable cover 44 such that longitudinal portions of the cutting water supply nozzles 36 and 46 sandwich the cutting blade 32 therebetween and are substantially parallel with the X-axis direction. Next, referring to FIG. 5, description will be made of a partition plate 52 disposed at a boundary between the mounting and demounting region $R_A$ and the cutting region $R_B$ and the like. A metallic casing 54 is disposed over the chuck table 20. A door unit 56 formed of a transparent resin and capable of being opened and closed by being rotated in a horizontal plane is provided on the front surface side of the casing 54 (monitor 6 side of the cutting apparatus 2 illustrated in FIG. 3) in the mounting and demounting region $R_A$. In addition, a door unit 58 formed of a transparent resin and capable of being opened and closed by being slid in the X-axis direction is provided on the front surface side of the casing 54 in the cutting region $R_B$.

Figure 5:
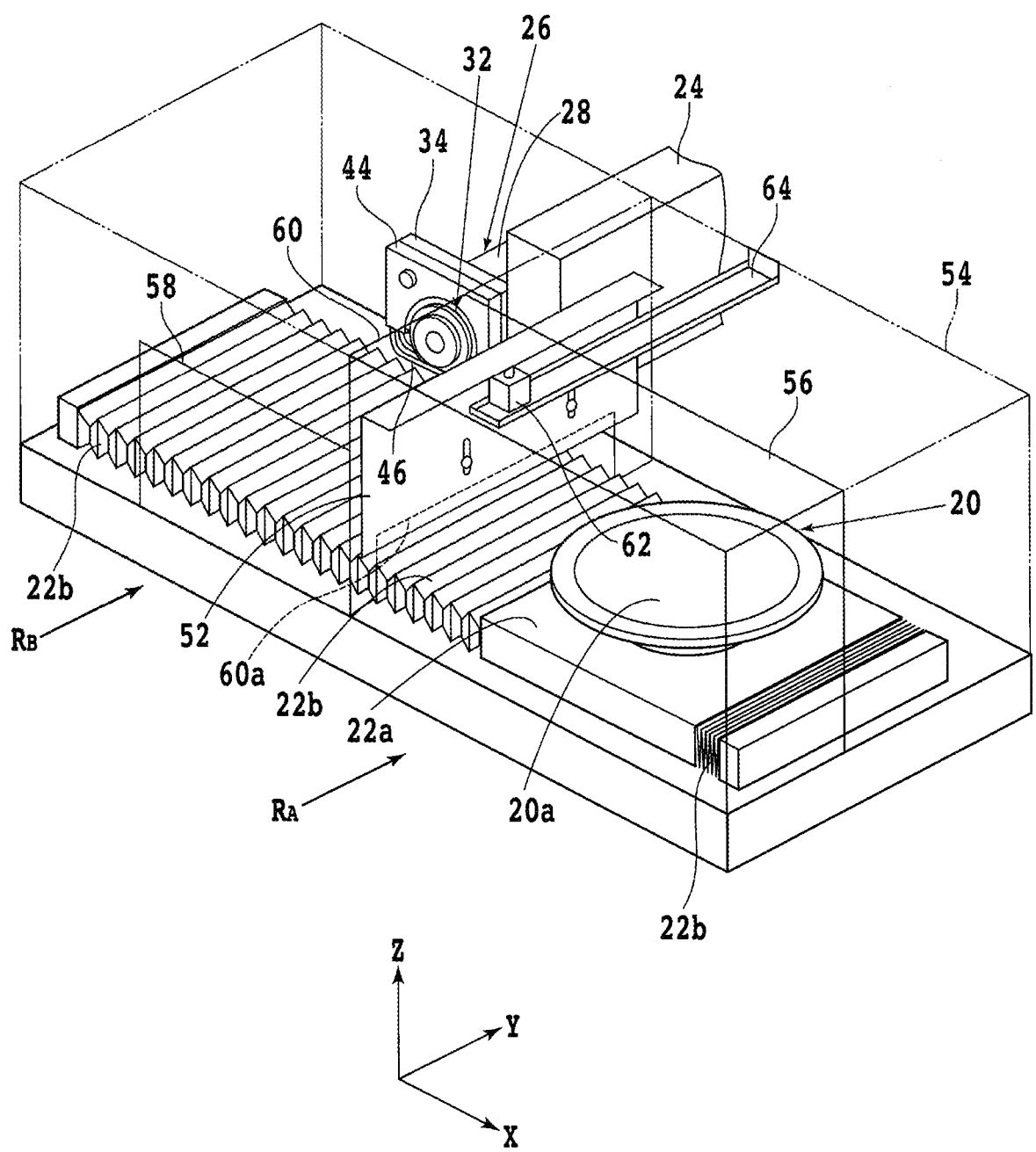

A partition wall 60 is provided between the mounting and demounting region $R_A$ and the cutting region $R_B$. An opening portion 60a is formed in a lower portion of the partition wall 60. The partition plate 52 is disposed on the mounting and demounting region $R_A$ side of the partition wall 60. FIG. 5 is a view illustrating the partition plate 52 and the like. An upper portion of the partition plate 52 is bent in the X-axis direction. This bent portion is supported by a piston rod of an air cylinder 62. The air cylinder 62 itself is supported by a supporting member 64 fixed to the casing 54. When the piston rod of the air cylinder 62 is raised, the opening portion 60a is opened, as illustrated in FIG. 5. When the piston rod is lowered, the opening portion 60a is closed. For example, the opening portion 60a is opened when the chuck table 20 is moved between the mounting and demounting region $R_A$ and the cutting region $R_B$. When the workpiece 21 is cut, the opening portion 60a is closed after the chuck table 20 is moved to the cutting region $R_B$.

Here, returning to FIG. 3, other constituent elements of the cutting apparatus 2 will be described. The cutting apparatus 2 includes a second transporting unit 66 that unloads the workpiece 21 or the like from the chuck table 20 disposed in the mounting and demounting region $R_A$ after cutting. The second transporting unit 66 has an arm movable in the Y-axis direction. A suction mechanism for sucking the frame 25 is provided to a distal end portion of the arm. A cleaning unit 68 is provided in the rear of the mounting and demounting region $R_A$. The cleaning unit 68 includes a spinner table (not illustrated) that holds under suction the workpiece 21 or the like and a cleaning nozzle (not illustrated) disposed above the spinner table.

The workpiece 21 transported to the cleaning unit 68 by the second transporting unit 66 is cleaned, and is then loaded into the cassette 8 by the first transporting unit 18, the pair of positioning members 16, and the push-pull arm 14. A control unit 70 controls operations of the cassette elevator 12, the push-pull arm 14, the pair of positioning members 16, the first transporting unit 18, the chuck table 20, the imaging unit 24a, the cutting unit 26, the air cylinder 62, the second transporting unit 66, the processing feed unit, the cutting feed unit, the indexing feed unit, and the like described above.

The control unit 70 is, for example, constituted by a computer including a processor (processing unit) typified by a central processing unit (CPU), a main storage device such as a dynamic random access memory (DRAM), a static random access memory (SRAM), or a read only memory (ROM), and an auxiliary storage device such as a flash memory, a hard disk drive, or a solid-state drive. The auxiliary storage device stores software including a predetermined program. Functions of the control unit 70 are implemented by operating the processing unit or the like according to the software. The control unit 70 sets the opening portion 60*a* in an open state when the workpiece 21 held by the chuck table 20 moves between the mounting and demounting region $R_A$ and the cutting region $R_B$ (see FIG. 5).

Figure 6:
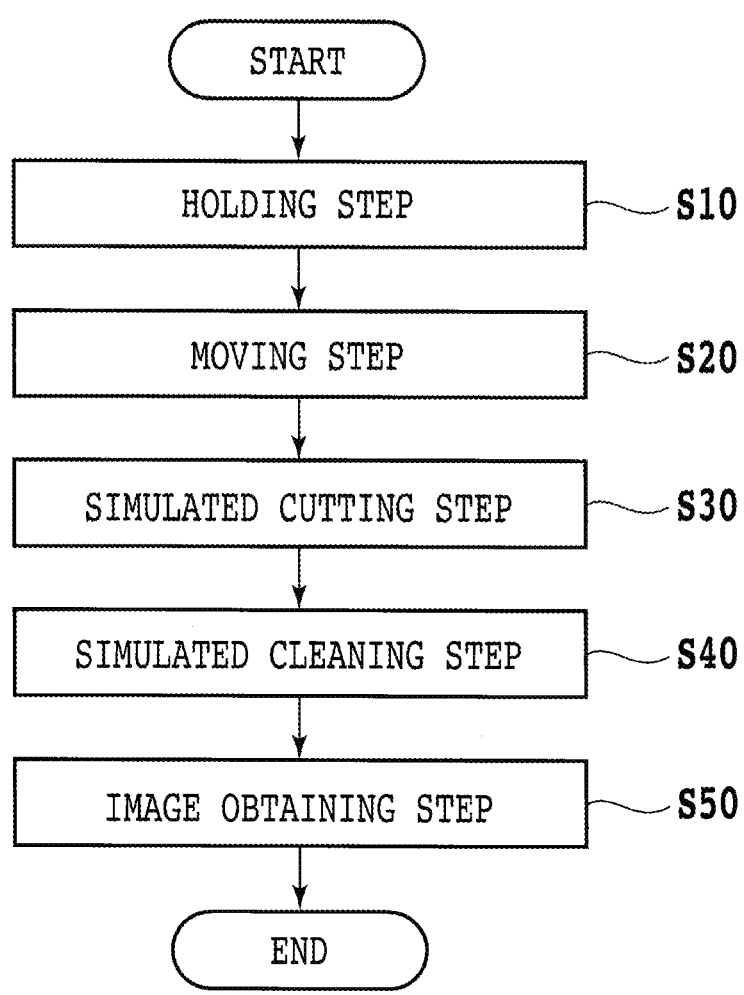
FIG. 6 is a flowchart illustrating an inspecting method.

However, in work of replacing the partition plate 52 or the like, the partition plate 52 may be erroneously attached at a position lower than a specified position. In addition, in work of replacing the cutting blade 32 and work of adjusting the positions of the cutting water supply nozzles 36 and 46, distal end portions of the cutting water supply nozzles 36 and 46 may also be erroneously attached at a position lower than a specified position. Accordingly, the inspection substrate 11 is used to inspect whether or not constituent elements of the cutting apparatus 2 such as the partition plate 52 and the cutting water supply nozzles 36 and 46 are attached normally. FIG. 6 is a flowchart illustrating an inspecting method using the inspection substrate 11.

First, the chuck table 20 disposed in the mounting and demounting region $R_A$ holds under suction the undersurface 11*b* side of the inspection substrate 11 in the form of a frame unit (holding step S10). At this time, the top surface 11*a* of the inspection substrate 11 is set upward, and the paint layer 15 is thereby exposed upward. After the holding step S10, the opening portion 60*a* is set in an open state, and then the chuck table 20 is moved from the mounting and demounting region $R_A$ to the cutting region $R_B$ (moving step S20). Thus, if the partition plate 52 is attached at a position lower than the specified position, a scratch is formed on the top surface 11*a* side of the inspection substrate 11, and the paint layer 15 in a region corresponding to the scratch is peeled off.

After the moving step S20, the orientation of the chuck table 20 is adjusted by the θ table using the positions of two key patterns separated from each other in an image of the top surface 11*a* side or the like such that the longitudinal direction of the groove portions 17 is substantially parallel with the X-axis direction. Then, the cutting blade 32 rotated at high speed is disposed on an extension of a groove portion 17, and further a lower end of the cutting blade 32 is positioned at a predetermined height higher than the bottom 17*c* in the groove portion 17. In this state, the chuck table 20 is moved in the X-axis direction relative to the cutting blade 32 without the cutting water being supplied from the cutting water supply nozzles 36 and 46.

The simulated cutting of the inspection substrate 11 is thus performed by passing a part of the cutting blade 32 in the groove portion 17 (simulated cutting step S30). After the simulated cutting is performed from one end to another end of one groove portion 17, the cutting unit 26 is indexing-fed by a predetermined index amount. Then, the simulated cutting is similarly performed after the lower end of the cutting blade 32 is positioned on an extension of another groove portion 17 adjacent in the Y-axis direction to the one groove portion 17 in which the simulated cutting has been performed. After the simulated cutting is performed in all of the groove portions 17 parallel with one direction, the chuck table 20 is rotated by 90 degrees.

Then, the simulated cutting is similarly performed in all of the remaining groove portions 17. In the simulated cutting step S30, when distal end portions of the cutting water supply nozzles 36 and 46 are in contact with the top surface 11*a* side, for example, scratches are formed on the top surface 11*a* side, and the paint layer 15 in regions corresponding to the scratches is peeled off. After the simulated cutting step S30, the chuck table 20 is moved from the cutting region $R_B$ to the mounting and demounting region $R_A$, and the second transporting unit 66 moves the inspection substrate 11 from the chuck table 20 to the cleaning unit 68.

Then, the spinner table (not illustrated) is rotated for a predetermined time without cleaning water or the like being jetted from the cleaning nozzle in a state in which the spinner table holds under suction the undersurface 11*b* side of the inspection substrate 11 (simulated cleaning step S40). Also in the simulated cleaning step S40, when a constituent element of the cleaning unit 68 is in contact with the top surface 11*a* side, a scratch is formed on the top surface 11*a* side, and the paint layer 15 in a region corresponding to the scratch is peeled off.

After the simulated cleaning step S40, the inspection substrate 11 is loaded into the cassette 8 by using the first transporting unit 18, the pair of positioning members 16, the push-pull arm 14, and the like. After the series of operations, the inspection substrate 11 loaded into the cassette 8 is extracted from the cassette 8 again. Then, the chuck table 20 holds the inspection substrate 11 under suction in such a manner that the top surface 11*a* is oriented upward. In this state, an image of the top surface 11*a* side of the inspection substrate 11 is obtained (image obtaining step S50). The obtained image is stored in the auxiliary storage device of the control unit 70.

Figure 7A:
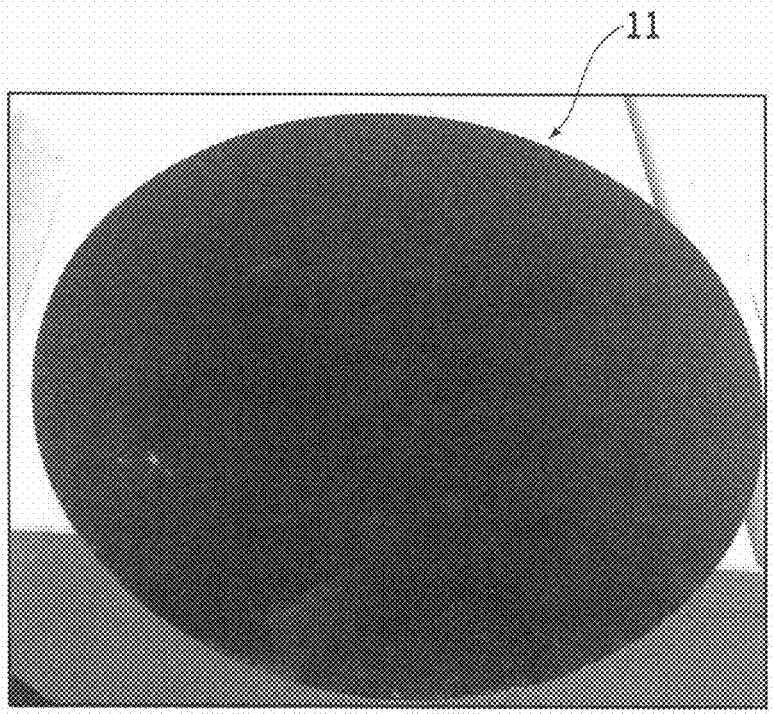
FIG. 7A is an image illustrating the whole of the inspection substrate.
Figure 7B:
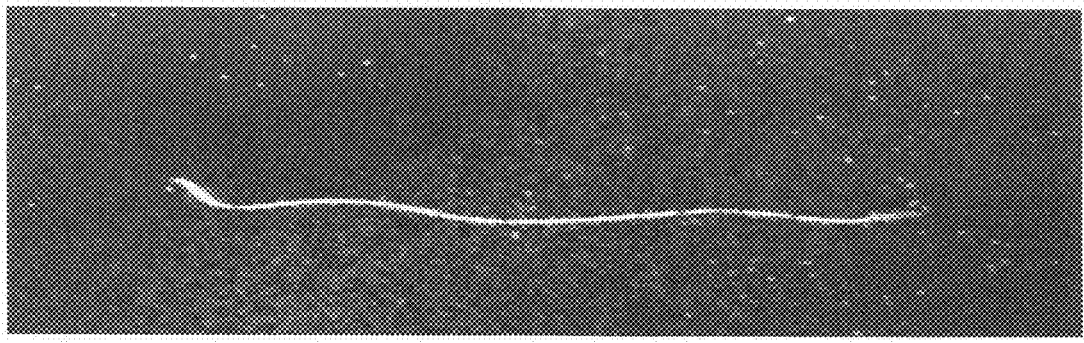
FIG. 7B is an enlarged image of a part of a top surface side on which a scratch is formed.
Figure 8A:
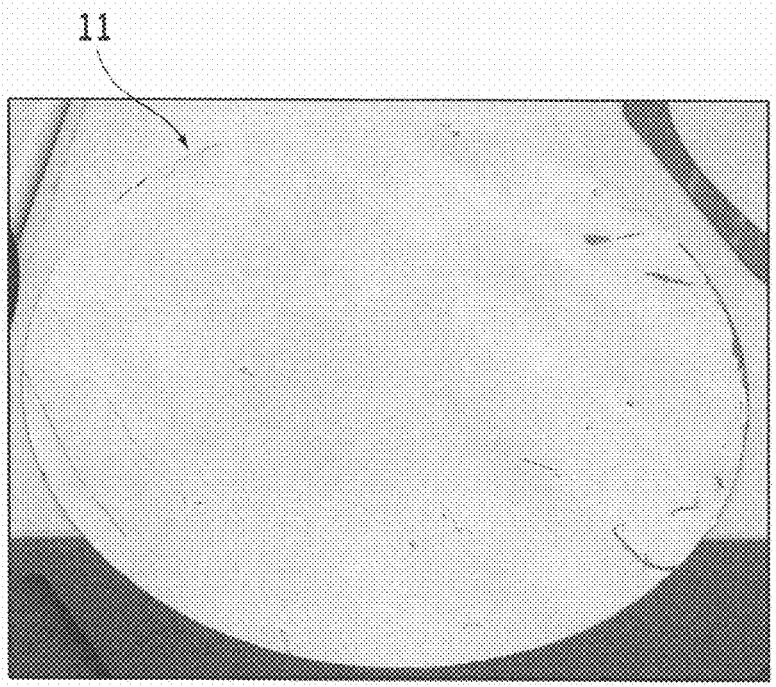
FIG. 8A is an image illustrating the whole of the inspection substrate.
Figure 8B:
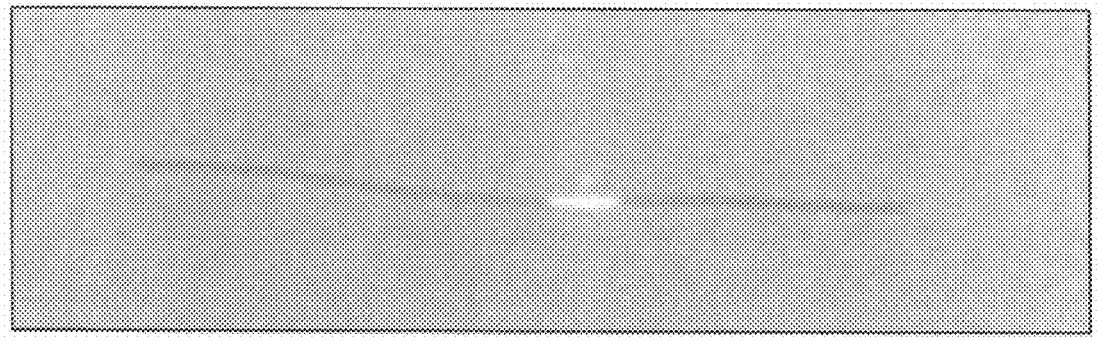
FIG. 8B is an enlarged image of a part of a top surface side on which a scratch is formed.

FIG. 7A is an image illustrating the whole of the inspection substrate 11 in which the paint layer 15 including carbon black as a pigment is formed on the top surface 11*a* side. FIG. 7B is an enlarged image of a part of the top surface 11*a* side on which a scratch is formed. In addition, FIG. 8A is an image illustrating the whole of the inspection substrate 11 in which the paint layer 15 including titanium oxide as a pigment is formed on the top surface 11*a* side. FIG. 8B is an enlarged image of a part of the top surface 11*a* side on which a scratch is formed.

The obtained image is processed by predetermined image processing software installed on the control unit 70, and a scratch and peeling of the paint layer 15 are detected. Detecting operation, for example, uses information regarding the brightness or shade of each of a plurality of pixels constituting the image. Specifically, the image processing software calculates a brightness difference (contrast) between one pixel and a plurality of pixels surrounding the one pixel. When the calculated contrast is higher than a predetermined value, the image processing software determines that there is a scratch in the pixel region.

In the present embodiment, a scratch formed on the inspection substrate 11 and peeling of the paint layer 15 can be detected by the imaging unit 24*a*. Therefore, as compared with a case where the workpiece 21 is inspected by an automatic optical inspection apparatus, whether or not constituent elements such as the cutting water supply nozzles 36 and 46 and the partition plate 52 are attached normally can be inspected at relatively low cost. In addition, if the peeling of the paint layer 15 does not occur, the same inspection substrate 11 can be used again, and thus the inspection substrate 11 can be reused. Inspection cost can be thereby reduced.

Incidentally, the image processing software may determine whether or not there is a scratch for each of a plurality of pixels by calculating an average value of brightness of a plurality of pixels (for example, 10 pixels) in an area of a predetermined size, and comparing average values of brightness between adjacent areas of the predetermined size. This can improve processing speed as compared with a case where contrast is calculated for each pixel. Besides, structures, methods, and the like according to the foregoing embodiment can be modified and implemented as appropriate without departing from the objective scope of the present invention. For example, the above-described inspection can be performed by using a frame unit (not illustrated) in which a rectangular inspection substrate 11 is supported by the frame 25 via the dicing tape 23.

Specifically, an inspection substrate 11 may be used in which a paint layer 15 including silica or sludge as a pigment is formed on a wafer 13 that is 200 mm square and 2 mm thick and made of polyethylene terephthalate. The use of silica or sludge as a pigment has an advantage in that, even if the paint layer 15 adheres to the inside of the cutting apparatus 2, a problem such as contamination is relatively less likely to occur as compared with a case where another material adheres.

Incidentally, the image obtaining step S50 is not necessarily performed only last, but may be performed in given timing before and after the moving step S20, before and after the simulated cutting step S30, and before and after the simulated cleaning step S40. For example, by comparing images of the top surface 11a side before and after the moving step S20, it is possible to inspect whether or not the partition plate 52 is attached normally excluding the effect of the cutting water supply nozzles 36 and 46. In addition, by comparing images before and after the simulated cutting step S30, for example, it is possible to inspect whether or not the cutting water supply nozzles 36 and 46 are attached normally excluding the effect of the partition plate 52.

The comparison of the images does not necessarily need to be performed by the image processing software. For example, the obtained images may be displayed on the monitor 6, and the operator may inspect the images for a scratch and peeling of the paint layer 15. With regard to the inspection substrate 11, the foregoing description has been made of an example in which the paint layer 15 is formed on the wafer 13 having the plurality of groove portions 17 formed thereon. However, the plurality of groove portions 17 may be formed by cutting the top surface 13a side of the wafer 13 having the paint layer 15 formed on the top surface 13a. In this case, the paint layer 15 does not remain on the side surfaces and the bottoms 17c of the groove portions 17. However, no problem is presented in performing the above-described inspection.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An inspecting method of inspecting, by using an inspection substrate, whether or not a constituent element of a wafer cutting apparatus may form a scratch on a top surface of a workpiece when a cutting blade cuts the workpiece by simulating a cutting operation on the inspection substrate,
    the inspection substrate comprising a disk-shape wafer including:
        a top surface side of the inspection substrate having a groove portion for simulated cutting, and
        a paint layer disposed on the top surface side of the inspection substrate including being disposed within the groove portion of the inspection substrate to improve visibility of a scratch formed on the top surface side, the paint layer having a thickness, the paint layer having a color different from a color of the top surface side of the inspection substrate,
        the groove portion having a width greater than the width of a cutting blade of the wafer cutting apparatus such that the cutting blade may be operated within the groove portion without contacting sides of the groove portion or the paint layer disposed on the sides of the groove portion, the groove portion having a depth greater than a maximum amount of blade protrusion of the cutting blade such that the cutting blade may be operated within the groove portion without contacting a bottom of the groove portion or the paint layer disposed on the bottom of the groove portion,
    the inspecting method comprising:
        a holding step of holding an undersurface side of the inspection substrate, with the top surface of the inspection substrate set upward, by a chuck table disposed in a mounting and demounting region of the wafer cutting apparatus;
        a moving step of moving the chuck table from the mounting and demounting region to a cutting region of the wafer cutting apparatus in which simulated cutting of the inspection substrate is performed after the holding step;
        a simulated cutting step of performing the simulated cutting by positioning a lower end of the cutting blade at a predetermined height higher than the bottom of the groove portion and the paint layer disposed on the bottom of the groove portion and passing a part of the cutting blade in the groove portion while the cutting blade is being rotated; and
        an image obtaining step of obtaining an image of the top surface side of the inspection substrate.

2. The inspecting method of claim 1 further comprising inspecting the obtained image to detect if a scratch has been made in the paint layer during the moving step or simulated cutting step.

3. The inspecting method of claim 2 further comprising detecting that a portion of a cutting water supply nozzle of the wafer cutting apparatus contacted the top surface side of the inspection substrate and formed a scratch therein.

4. The inspecting method of claim 2 further comprising detecting that a partition plate of the wafer cutting apparatus contacted the top surface side of the inspection substrate and formed a scratch therein, the partition plate positioned between the mounting and demounting region and the cutting region of the wafer cutting apparatus.

5. The inspecting method of claim 2 wherein it is detected that no scratch has been made in the paint layer during the moving step or simulated cutting step; and method further comprising:
    using the inspection substrate again in a second performance of the inspection method.

6. The inspecting method of claim 1 wherein the inspection substrate is made of a resin.

7. The inspecting method of claim 6 wherein the inspection substrate has a diameter of 300 mm and a thickness of 2 mm.

8. The inspecting method of claim 1 wherein the paint layer has a thickness of at least 10 μm.

9. The inspecting method of claim 1 wherein the paint layer is black.

10. The inspecting method of claim 1 wherein the paint layer comprises a pigment formed by silica powder or sludge formed by swarf produced accompanying cutting or grinding of a wafer made of silicon.

11. The inspecting method of claim 1 wherein the paint layer is white.

12. The inspecting method of claim 1 wherein the inspection substrate comprises a plurality of groove portions arranged in a lattice on the top surface side of the inspection substrate and
   wherein the simulated cutting step comprises passing part of the cutting blade in each of the plurality of groove portions.

13. The inspecting method of claim 1 wherein the groove portion has a width of 5 mm and the cutting blade has a thickness of 100 µm.

* * * * *